(12) United States Patent
Ohtomo et al.

(10) Patent No.: US 9,444,243 B2
(45) Date of Patent: Sep. 13, 2016

(54) PROTECTION AND CONTROL SYSTEM, AND MERGING UNIT

(71) Applicant: Kabushiki Kaisha Toshiba, Tokyo (JP)

(72) Inventors: Yu Ohtomo, Higashimurayama (JP); Akira Ishibashi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 318 days.

(21) Appl. No.: 14/264,461

(22) Filed: Apr. 29, 2014

(65) Prior Publication Data

US 2014/0232415 A1    Aug. 21, 2014

Related U.S. Application Data

(63) Continuation of application No. PCT/JP2012/005729, filed on Sep. 11, 2012.

(30) Foreign Application Priority Data

Nov. 11, 2011    (JP) ................................. 2011-247946

(51) Int. Cl.
*H02H 1/00* (2006.01)
*H02H 7/26* (2006.01)
*H02J 13/00* (2006.01)

(52) U.S. Cl.
CPC ......... *H02H 1/0007* (2013.01); *H02H 1/0061* (2013.01); *H02H 7/261* (2013.01); *H02J 13/0006* (2013.01); *Y02E 60/725* (2013.01); *Y02E 60/74* (2013.01); *Y04S 10/20* (2013.01); *Y04S 10/30* (2013.01)

(58) Field of Classification Search
CPC combination set(s) only.
See application file for complete search history.

(56) References Cited

U.S. PATENT DOCUMENTS

| 4,663,691 A | 5/1987 | Koppl |
| 6,954,704 B2 | 10/2005 | Minami et al. |
| 2002/0116092 A1 | 8/2002 | Hamamatsu et al. |

FOREIGN PATENT DOCUMENTS

| JP | 2004-072905 A | 3/2004 |
| JP | 3907998 B2 | 4/2007 |
| JP | 2007-288921 A | 11/2007 |

(Continued)

OTHER PUBLICATIONS

Extended European Search Report issued in related European Patent application No. EP 12847891.4, mailed on Jul. 22, 2015 (6 pages).

(Continued)

*Primary Examiner* — Clayton E LaBalle
*Assistant Examiner* — Jas Sanghera
(74) *Attorney, Agent, or Firm* — Baker Botts L.L.P.

(57) ABSTRACT

A protection and control system includes a first merging unit which obtains an electric variable from a transformer installed in an electric power system, and digitally converts the obtained electric variable to output the converted electric as first electric variable information to a network, and a plurality of protection and control devices, each of which obtains the first electric variable information from the first merging unit through the network, judges whether or not a system fault occurs in a zone to be protected of the electric power system based on a predetermined relay characteristic, and outputs main trip information to the network when that the system fault occurs is judged, wherein the first merging unit judges whether or not the system fault occurs in the zone to be protected.

8 Claims, 10 Drawing Sheets

(56) References Cited

FOREIGN PATENT DOCUMENTS

| | | |
|---|---|---|
| JP | 2010-068594 A | 3/2010 |
| JP | 2011-223647 A | 11/2011 |

OTHER PUBLICATIONS

International Preliminary Report on Patentability issued in related PCT Application No. PCT/JP2012/005729 mailed on May 13, 2014, 6 pages.

PROTECTION AND CONTROL SYSTEM, AND MERGING UNIT

CROSS-REFERENCE TO RELATED APPLICATION

This by-pass continuation application is based upon and claims the benefit of priority from International Application No. PCT/JP2012/005729, filed on Sep. 11, 2012 and Japanese Patent Application No. 2011-247946, filed on Nov. 11, 2011; the entire contents of which are incorporated herein by reference.

FIELD

Embodiments described herein relate to a protection and control system, and a merging unit.

BACKGROUND

Conventionally, protection and control devices are used for the protection and control of an electric power system. In case that this protection and control device judges that a fault has occurred in the electric power system based on electric variables of the electric power system, it performs control such as opening a circuit breaker.

In addition, the protection and control device is made redundant so as to perform protection and control operation using two or more sets of hardware in order not to perform erroneous control to a circuit breaker, even in case that a malfunction occurs in a part of the hardware and software of the protection and control device. The protection and control devices which are made redundant are called a main detection relay (hereinafter, called a Main (Main)) and a fault detection relay (hereinafter, called a FD (Fault Detector)), and are composed of different hardware respectively, to thereby realize proper protection and control of the electric power system without performing erroneous control (erroneous operation), even in case that a malfunction occurs in one hardware. In addition, the redundancy is to arrange and operate a standby device as backup even in the normal time, in preparation for the case in which a failure of some kind occurs in a part of a system, so that the function of the whole system can be continuously maintained even after the occurrence of the failure.

Furthermore, a protection and control system is recently thought of which connects a merging unit (hereinafter, called a MU (Merging Unit)) to detect electric variables of a current transformer (hereinafter, called a CT (Current Transformer)) and a voltage transformer (hereinafter, called a VT (Voltage Transformer)) which are installed in an electric power system, and a protection and control device to judge the presence or absence of a fault based on the detected electric variables, through a network called a process bus. Here, the MU detects the electric variables, and transmits electric variable information to the protection and control device through the process bus. In addition, the protection and control device receives electric variable information from the MU through the process bus, and judges whether or not a system fault has occurred in a zone to be protected based on the received electric variable information.

Here, when it is judged by the protection and control device that a system fault has occurred, the MU opens a circuit breaker or a switch which is connected. This conventional MU is not provided with a trip circuit and so on, and the judgment whether or not to open the circuit breaker or the switch is dependent on the judgment of the protection and control device.

Even in the protection and control device of the above described protection and control system to which the process bus is applied, it is required that the protection and control device is provided with a Main and a FD which are composed of different hardware, respectively, and is thereby made redundant. But, in case that a plurality of protection and control devices are connected to the process bus, since the protection and control devices are made redundant, respectively, the hardware and the cost thereof increase.

DETAILED DESCRIPTION

According to one embodiment, there is provided a protection and control system, including a first merging unit which obtains an electric variable from a transformer installed in an electric power system, and digitally converts the obtained electric variable to output the converted electric as first electric variable information to a network; and a plurality of protection and control devices, each of which obtains the first electric variable information from the first merging unit through the network, judges whether or not a system fault occurs in a zone to be protected of the electric power system based on a predetermined relay characteristic, and outputs main trip information to the network when that the system fault occurs is judged, wherein the first merging unit judges whether or not the system fault occurs in the zone to be protected of the electric power system based on the first electric variable information, and a plurality of the relay characteristics which are predetermined as respective fault detection relays of the protection and control devices, holds FD trip information when that the system fault occurs is judged, and judges opening or closing of a circuit breaker or a switch which is installed in the electric power system based on the FD trip information and the main trip information.

First Embodiment

Figure 1:
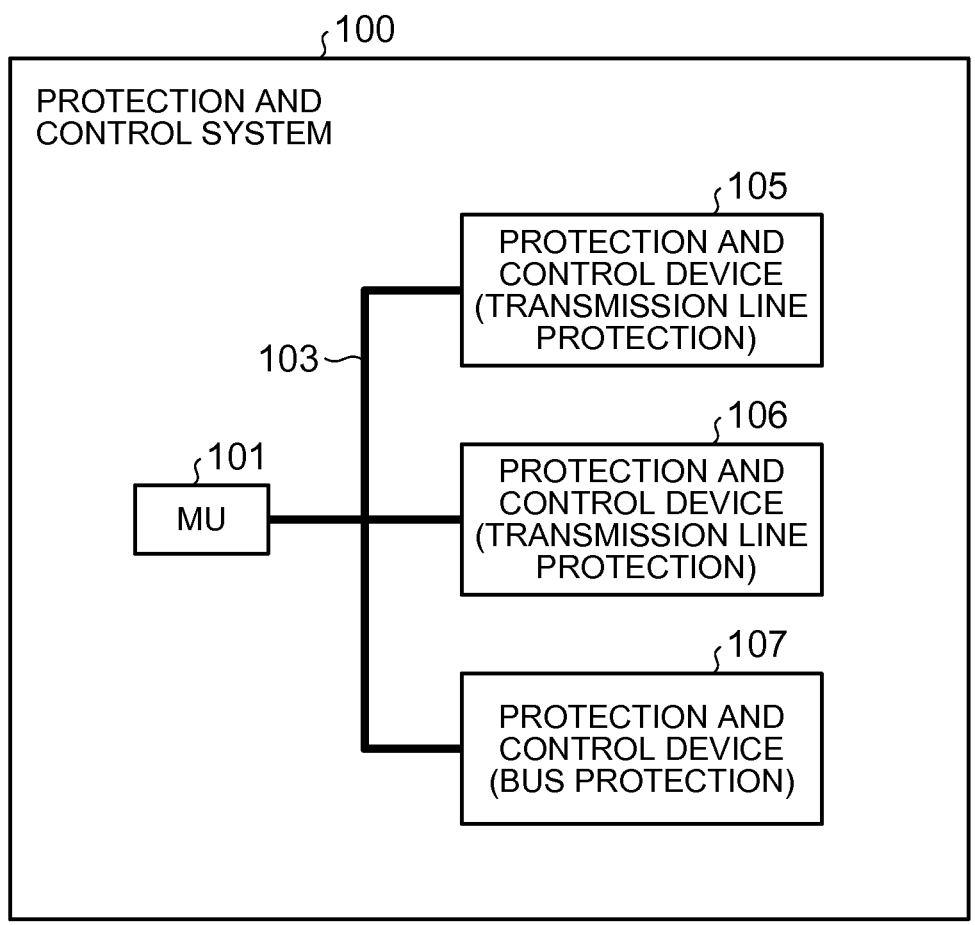
FIG. 1 is a diagram showing the configuration of a protection and control system of a first embodiment.

The configuration of a protection and control system of a first embodiment will be described using FIG. 1. FIG. 1 is a diagram showing the configuration of a protection and control system 100.

The protection and control system 100 is provided with a MU (Merging Unit) 101, a process bus 103, and protection and control devices 105-107.

The MU 101 detects electric variables of a CT (Current Transformer) and a VT (Voltage Transformer) not shown which is installed in an electric power system, and outputs as electric variable information to the process bus 103. In addition, the MU 101 receives trip information from the process bus 103, and outputs a trip command so as to open a circuit breaker not shown in case that the trip condition comes into effect. Though the detailed description of the trip information here will be made later, the trip information indicates 87 trip information, 44·51G trip information, and B87G·B87S trip information. The trip means that a circuit breaker or a switch is opened from any cause in an electric power system to thereby cause electric power transmission to be stopped.

The process bus 103 is connected to the MU 101 and the protection and control devices 105-107, and puts the mutual information transmission among the MU 101 and the protection and control devices 105-107 into practice.

The protection and control device 105 is composed of a computer provided with a CPU, a memory and so on, and is connected to the process bus 103. The protection and control device 105 judges a system fault in a zone to be protected based on the electric variable information received from the MU 101 through the process bus 103. In case that the protection and control device 105 judges that a system fault occurs in the zone to be protected, it outputs the 87 trip information to the process bus 103. The protection and control device 105 here judges the system fault in the zone to be protected so as to protect the transmission line, and uses a current differential relay system (87) as its relay characteristic.

Since the protection and control device 106 is similar to the protection and control device 105, the detailed description thereof will be omitted, but it differs in that it uses a distance relay system (44) and a ground overcurrent relay system (51G) as its relay characteristics. In case that the protection and control device 106 judges that a system fault occurs in the zone to be protected, it outputs the 44·51G trip information to the process bus 103.

Since the protection and control device 107 is similar to the protection and control device 105, the detailed description thereof will be omitted, but it differs in that the protection object is the bus, and further it uses a percentage differential relay system (B87G, B87S) as its relay characteristic. The protection and control device having the present characteristic is called a BP protection and control device. In case that the protection and control device 107 judges that a system fault occurs in the zone to be protected, it outputs the B87G·87S trip information to the process bus 103.

In addition, at the foot of the relay systems described here, control instrument numbers corresponding to them are respectively described in parentheses, and are described similarly in the following.

Hereinafter, the 87 trip information, the 44·51G trip information, and the 87G·87S trip information which are respectively outputted from the protection and control devices 105-107 are called main trip information.

Figure 2:
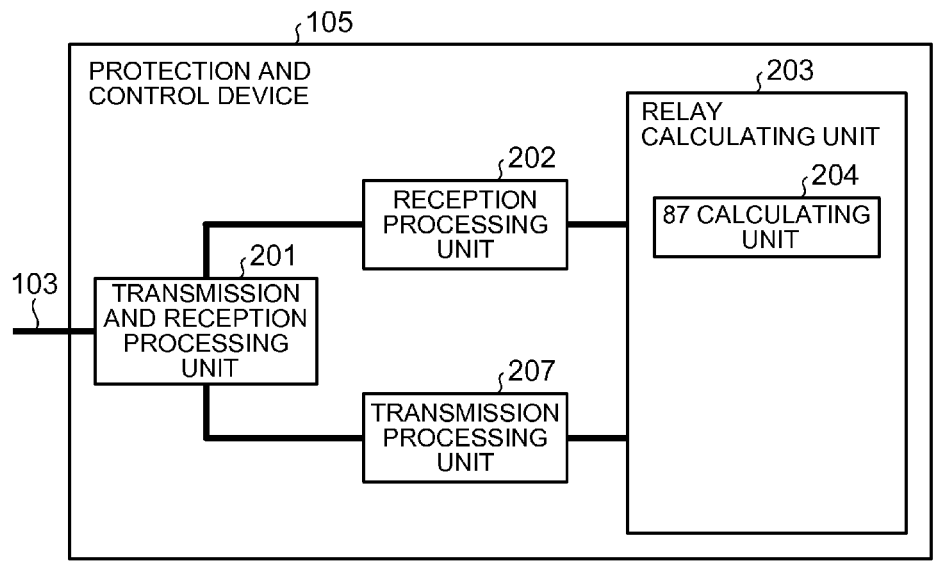
FIG. 2 is a functional block diagram showing the configuration of the protection and control device of the first embodiment.

Next, the configuration of the protection and control device 105 will be described using FIG. 2. FIG. 2 is a functional block diagram showing the configuration of the protection and control device 105.

The protection and control device 105 is provided with a transmission and reception processing unit 201, a reception processing unit 202, a relay calculating unit 203, and a transmission processing unit 207. In addition, the relay calculating unit 203 is provided with an 87 calculating unit 204.

The transmission and reception processing unit 201 is connected to the process bus 103, the reception processing unit 202, and the transmission processing unit 207. This transmission and reception processing unit 201 obtains the electric variable information from the MU 101 through the process bus 103, and outputs it to the reception processing unit 202. In addition, the transmission and reception processing unit 201 obtains the 87 trip information outputted from the transmission processing unit 207, and outputs it to the process bus 103.

The reception processing unit 202 is connected to the transmission and reception processing unit 201 and the relay calculating unit 203. This reception processing unit 202 converts the electric variable information obtained from the transmission and reception processing unit 201 to output the converted electric variable information to the relay calculating unit 203. In the conversion here, the electric variable information transmitted through the process bus 103 is converted into a format which the relay calculating unit 203 can process.

The relay calculating unit 203 is put into practice by a program which is operated mainly by the CPU, and is stored in a storage medium not shown, such as a HDD, a SSD (Solid State Drive), a RAM and so on. The relay calculating unit 203 is provided with the 87 calculating unit 204. The 87 calculating unit 204 judges whether or not to output the 87 trip information to the transmission and reception processing unit 201 based on the electric variable information obtained from the reception processing unit 202.

The transmission processing unit 207 is connected to the relay calculating unit 203 and the transmission and reception processing unit 201. This transmission processing unit 207 converts the 87 trip information obtained from the relay calculating unit 203 to output to the transmission and reception processing unit 201. In the conversion here, the 87 trip information obtained from relay calculating unit 203 is converted into a format which can be transmitted through the process bus 103.

In addition, the point that the configurations of the protection and control devices 106, 107 are different from the configuration of the above-described protection and control device 105 is that each of the protection and control devices 106, 107 is provided with a calculating unit corresponding to the relay characteristic thereof. That is, the protection and control device 106 is provided with a calculating unit to perform a distance relay calculation (44) and a ground overcurrent relay calculation (51G), and judges whether or not to output the 44·51G trip information. The protection and control device 107 is provided with a calculating unit to perform a percentage differential relay calculation (B87G, B87S), and judges whether or not to output the B87G·B87S trip information.

Figure 3:
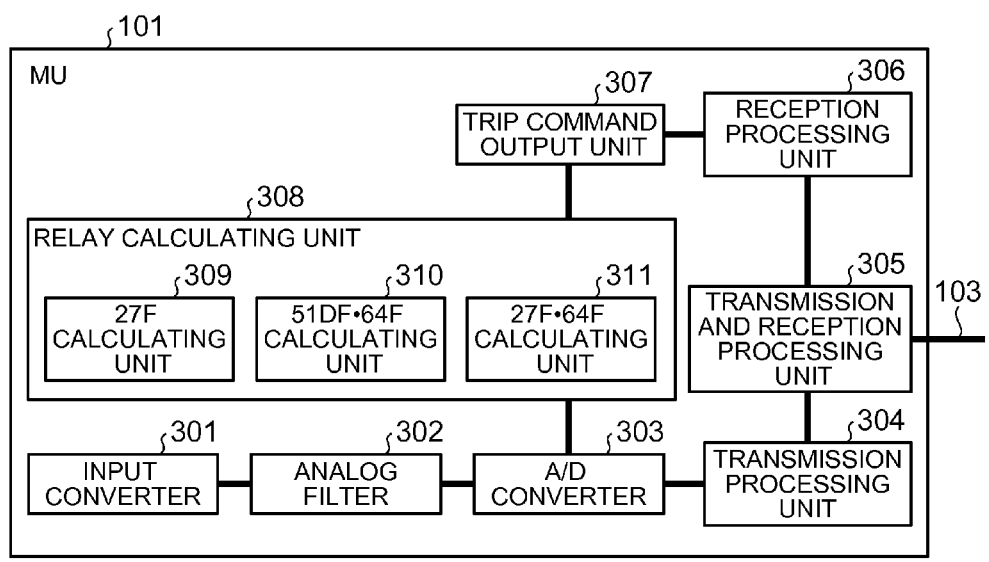
FIG. 3 is a functional block diagram showing the configuration of the MU of the first embodiment.

Next, the configuration of the MU 101 will be described using FIG. 3. FIG. 3 is a functional block diagram showing the configuration of the MU 101.

The configuration of the MU 101 is provided with an input converter 301, an analog filter 302, an A/D converter 303, a transmission processing unit 304, a relay calculating unit 308, a transmission and reception processing unit 305, a reception processing unit 306, and a trip command output unit 307. The relay calculating unit 308 is provided with a 27F calculating unit 309, a 51DF•64F calculating unit 310, and a 27F•64F calculating unit 311.

The input converter 301 is connected to a CT and a VT not shown and the analog filter 302, and obtains electric variables of the electric power system measured by the CT and the VT and outputs them to the analog filter 302.

The analog filter 302 is connected to the input converter 301 and the A/D converter 303, and removes noise and harmonic component of the electric variables obtained from the input converter 301 to output to the A/D converter 303.

The A/D converter 303 is connected to the analog filter 302, the transmission processing unit 304, and the relay calculating unit 308, and digitizes the electric variables of the analog data obtained from the analog filter 302 to output as the electric variable information to the transmission processing unit 304 and the relay calculating unit 308.

The transmission processing unit 304 is connected to the A/D converter 303 and the transmission processing unit 305, and converts the electric variable information of the digital data obtained from the A/D converter 303 to output to the transmission and reception processing unit 305. In the conversion here, the electric variable information is converted into a format which can be transmitted through the process bus 103.

The relay calculating unit 308 is put into practice by a program which is operated mainly by a CPU, and is stored in a storage medium not shown, such as a HDD, a SSD, a RAM and so on, and is connected to the A/D converter 303 and the trip command output unit 307. In addition, the relay calculating unit 308 is composed of the 27F calculating unit 309, the 51DF•64F calculating unit 310 and the 27F•64F calculating unit 311.

Here, the 27F calculating unit 309 functions as the FD of the protection and control device 105, and judges whether of not to open a circuit breaker using an AC undervoltage relay system (27F). In case that the 27F calculating unit 309 judges to open the circuit breaker, it outputs 27F trip information to the trip command output unit 307. The 51DF•64F calculating unit 310 functions as the FD of the protection and control device 106, and in case that the 51DF•64F calculating unit 310 judges to open the circuit breaker, it outputs 51DF•64F trip information to the trip command output unit 307. The 27F•64F calculating unit 311 functions as the FD of the protection and control device 107, and in case that the 27F•64F calculating unit 310 judges to open the circuit breaker, it outputs 27F•64F trip information to the trip command output unit 307.

The above-described 27F trip information, the 51DF•64F trip information, and the 27F•64F trip information are called FD trip information. Furthermore, the above-described main trip information and the FD trip information are called trip information.

The transmission and reception processing unit 305 is connected to the transmission processing unit 304, the reception processing unit 306, the process bus 103, and outputs the electric variable information obtained from the transmission processing unit 304 to the process bus 103. In addition, the transmission and reception processing unit 305 obtains the main trip information from the process bus 103 and outputs it to the reception processing unit 306.

The reception processing unit 306 is connected to the transmission and reception processing unit 305 and the trip command output unit 307, and converts the main trip information obtained from the transmission and reception processing unit 305 to output to the trip command output unit 307.

The trip command output unit 307 is composed of a trip circuit. In addition, this trip command output unit 307 is connected to the relay calculating unit 308, the reception processing unit 306, and a circuit breaker not shown, and judges whether or not to open the circuit breaker not shown based on the FD trip information obtained from the reception processing unit 308 and the main trip information obtained from the reception processing unit 306. Here, in case that the trip command output unit 307 judges to open the circuit breaker, it outputs the trip command to the circuit breaker.

Figure 4:
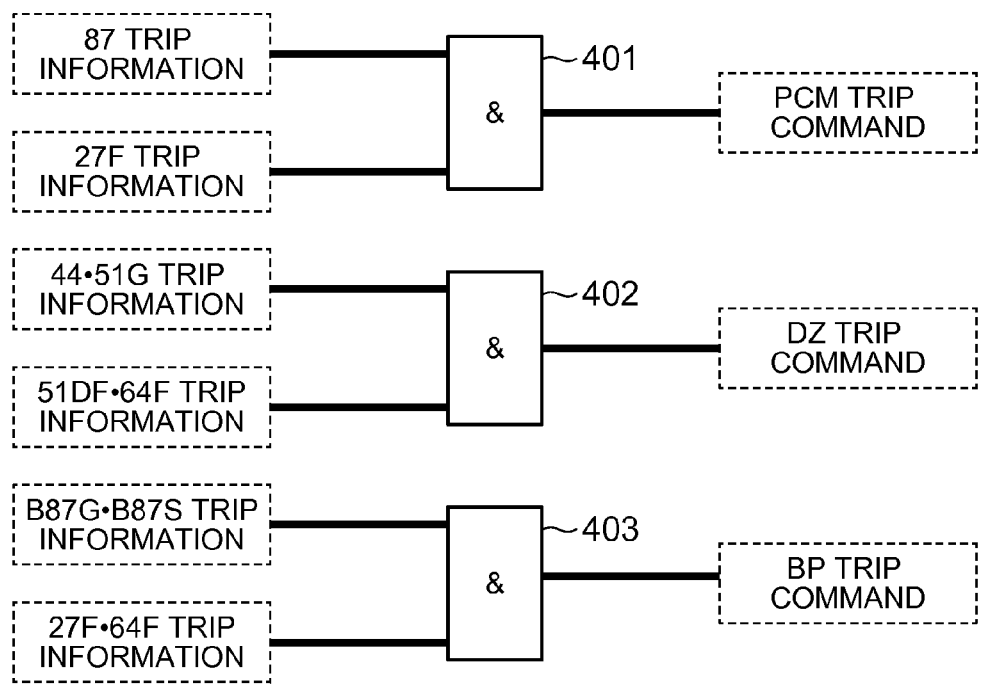
FIG. 4 is a diagram showing the control logic configuration of the trip command output unit of the first embodiment.

The trip will be described using FIG. 4 when this trip command output unit 307 judges whether or not to open the circuit breaker based on the main trip information and the FD trip information. FIG. 4 shows the control logic configuration of the trip command output unit 307.

The control logic configuration of this trip command output unit 307 is provided with AND gates 401-403. This trip command output unit 307 judges to open the circuit breaker or the switch, in case that it obtains the FD trip information corresponding to the fault detection relay of the obtained main trip information. That is, in case that the trip command output unit 307 receives the 87 trip information and the 27F trip information, it outputs a PCM trip command. The PCM trip command is a trip signal from a current differential relay. In case that the trip command output unit 307 receives the 44•51G trip information and the 51DF•64F trip information, it outputs a DZ trip command. The DZ trip command is a trip signal from a distance relay. In case that the trip command output unit 307 receives the B87G•B87S trip information and the 27F•64F trip information, it outputs a BP trip command. The BP trip command is a trip signal from a bus protection relay.

Figure 5:
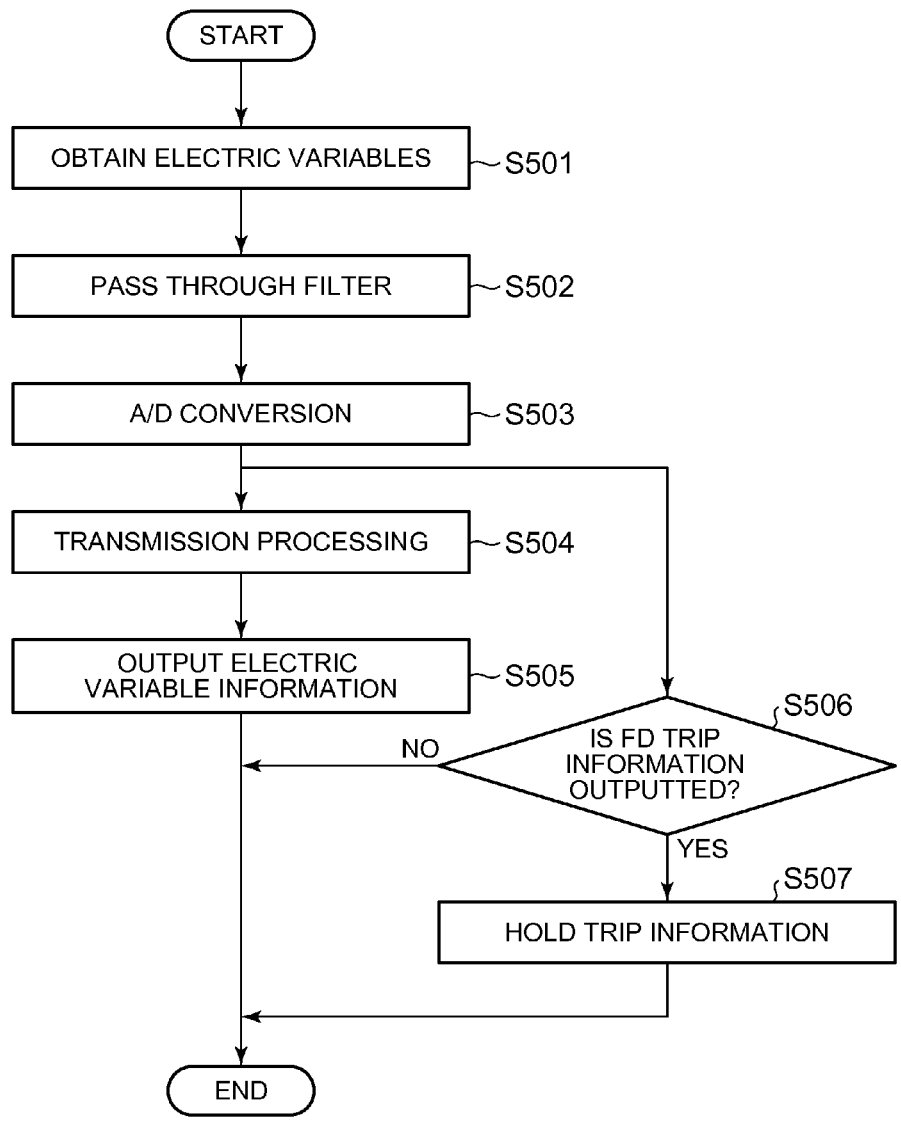
FIG. 5 is a flow chart showing the operation to output the electric variable information of the MU of the first embodiment.
Figure 6:
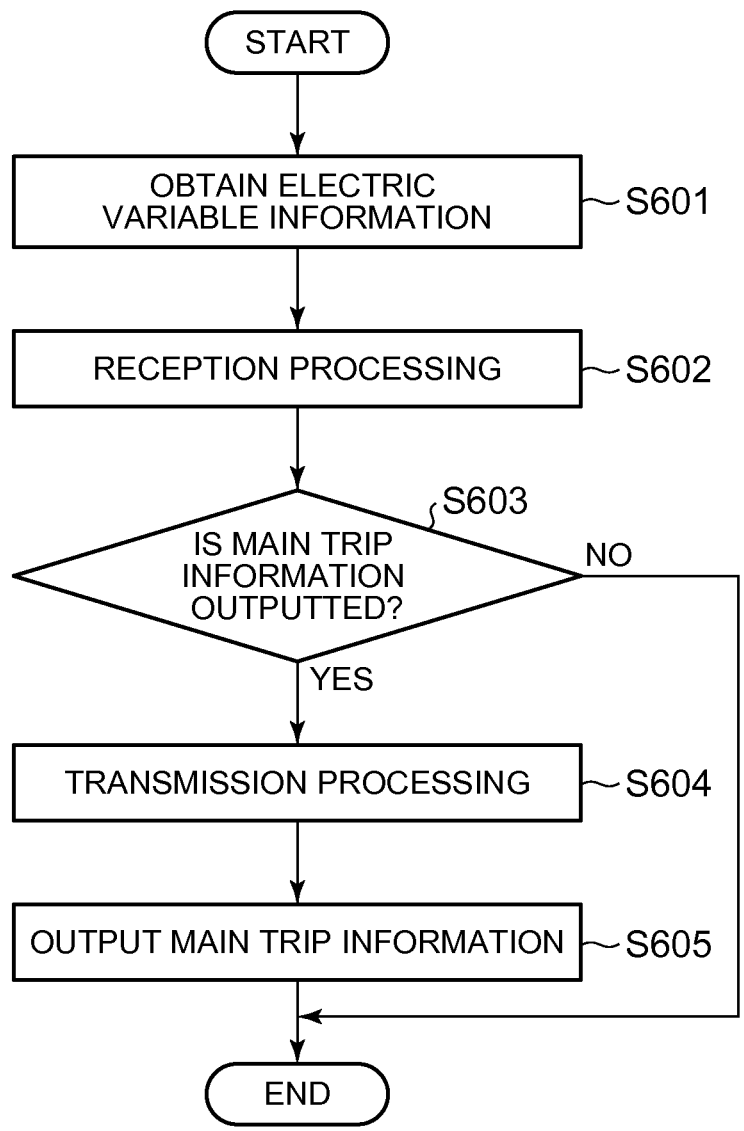
FIG. 6 is a flow chart showing the operation to output the trip information of the protection and control device of the first embodiment.
Figure 7:
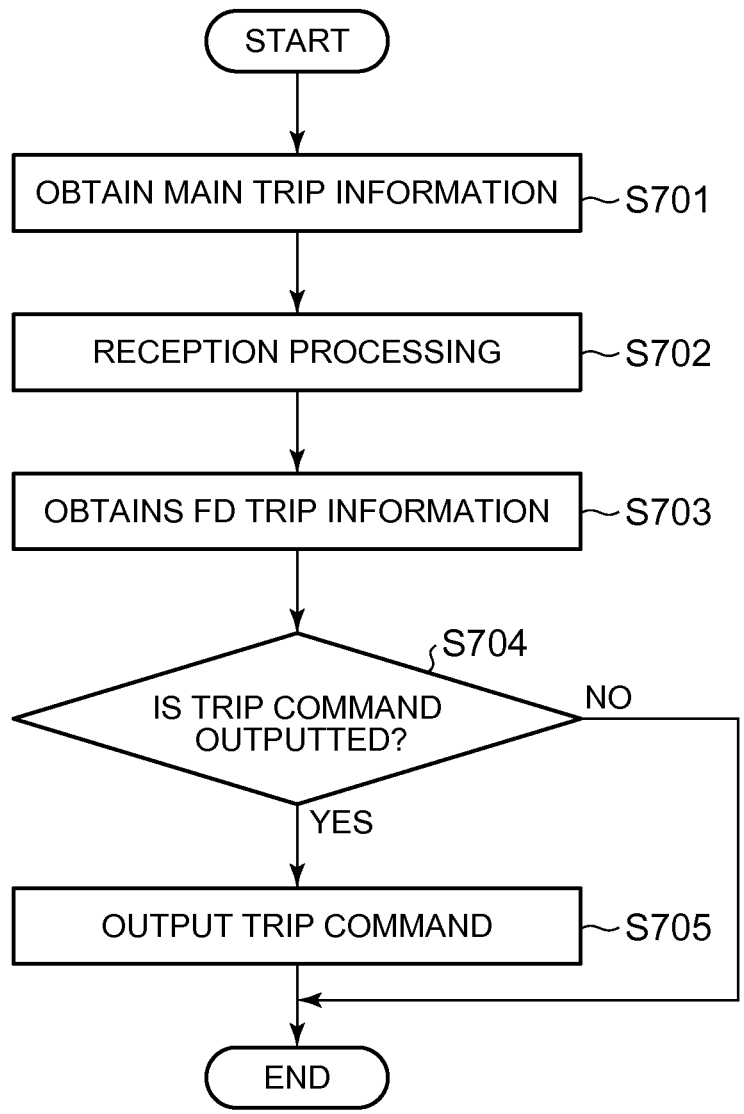
FIG. 7 is a flow chart showing the operation to output the trip command of the MU of the first embodiment.

(Operation) Next, the operations of the MU 101 and the protection and control devices 105-107 which compose the protection and control system 100 will be described using FIG. 5 to FIG. 7.

To begin with, an operation will be described using FIG. 5 after the MU 101 obtains the electric variables from the CT and the VT till the MU 101 outputs the electric variable information to the protection and control devices 105-107 through the process bus 103. FIG. 5 is a flow chart showing the operation of the MU 101, and is provided with following steps.

A step (S501) in which the input converter 301 obtains the electric variables from the CT and the VT not shown.

A step (S502) in which the analog filter 302 removes noise and harmonic component from the electric variables obtained from the input converter 301.

A step (S503) in which the A/D converter 303 digitally converts the electric variables obtained from the analog filter 302 into the electric variable information.

A step (S504) in which the transmission processing unit 304 converts the electric variable information obtained from the A/D converter 303 into a transmittable format.

A step (S505) in which the transmission and reception processing unit 305 outputs the electric variable information obtained from the transmission processing unit 304 to the process bus 103.

A step (S506) in which the 27F calculating unit 309, the 51DF•64F calculating unit 310, and the 27F•64F calculating unit 311 which compose the relay calculating unit 308 judge whether or not a system fault occurs in the zone to be protected based on the electric variable information obtained from the A/D converter 303 and the respective relay characteristics. Here, when it is judged that a system fault has not occurred (NO in S506), the flow ends.

A step (S507) in which when it is judged that a system fault occurs (YES in S506) by the step (S506) to judge whether or not a system fault occurs in the zone to be protected, the relay calculating unit 308 holds the FD trip information.

Next, an operation will be described using FIG. 6 after the protection and control devices 105-107 obtain the electric variable information from the MU 101 through the process bus 103, and judge whether or not a system fault occurs in the zone to be protected till the protection and control devices 105-107 output the main trip information to the MU 101 through the process bus 103 in case that the protection and control devices 105-107 judge that a system fault occurs. FIG. 6 is a flow chart showing the operation of the protection and control device 105, and is provided with following steps.

A step (S601) in which the transmission and reception processing unit 201 obtains the electric variable information from the process bus 103.

A step (S602) in which the reception processing unit 202 converts the electric variable information obtained from the transmission and reception processing unit 201 into a format which is capable for relay calculation.

A step (S603) in which the 87 calculating unit 204 composing the relay calculating unit 203 judges whether or not a system fault occurs in the zone to be protected based on the electric variable information obtained from the reception processing unit 202 and its relay characteristic. Here, when it is judged that a system fault does not occur (NO in S603), the flow ends.

A step (S604) in which when it is judged that a system fault occurs by the step (S603) to judge whether or not a system fault occurs in the zone to be protected (YES in S603), the relay calculating unit 203 outputs the main trip information to the transmission processing unit 207, and the transmission processing unit 207 converts the main trip information obtained from the relay calculating unit 203 into a transmittable format.

A step (S605) in which the transmission and reception processing unit 201 outputs the main trip information obtained from the transmission processing unit 207 to the process bus 103.

Here, the operation of the protection and control device 105 has been described, the operations of the protection and control devices 106, 107 differ in that in the step (S603) to judge whether or not to output the main trip information, each of the protection and control devices 106, 107 outputs the main trip information corresponding to its relay characteristic.

Next, an operation will be described using FIG. 7 after the MU 101 obtains the main trip information from the protection and control devices 105-107 through the process bus 103, and judges whether or not to output the trip command to a circuit breaker, till the MU 101 outputs the trip command to the circuit breaker in case that the MU 101 judges to output the trip command. FIG. 7 is a flow chart showing the operation of the MU 101, and is provided with following steps.

A step (S701) in which the transmission and reception processing unit 305 obtains the main trip information from the process bus 103.

A step (S702) in which the reception processing unit 306 obtains the main trip information from the transmission and reception processing unit 305, and converts it into a format by which the trip command output unit 307 can judge whether or not to output the trip command.

A step (S703) in which the trip command output unit 307 obtains the FD trip command held by the relay calculating unit 308.

A step (S704) in which the trip command output unit 307 judges whether or not to open the circuit breaker based on the main trip information obtained from the reception processing unit 306, the FD trip information obtained from the relay calculating unit 308, and the control logic configuration. Here, when it is judged not to open the circuit breaker (NO in S704), the flow ends.

A step (S705) in which when it is judged to open the circuit breaker in the step (S704) to judge whether or not to open the circuit breaker (YES in S704), the trip command output unit 307 outputs the trip command to the circuit breaker not shown.

(Effect) In a conventional protection and control system, since each of the protection and control devices was provided with a Main and a FD, and thereby relay hardware of twice the number of the protection and control devices connected to the same process bus was required, this caused the hardware amount to be increased and the cost thereof to be increased in a protection and control system adapted for a complicated electric power system. But according to the protection and control system 100 of the present embodiment, the functions of the FDs of the protection and control devices 105-107 connected to the process bus 103 are provided in the form of the relay calculating unit 308, and thereby the hardware amount thereof can be reduced.

In addition, in the present embodiment, the protection and control devices 105-107 make the transmission line protection (PCM, DZ) and the bus protection their tasks, respectively, for example, but a protection and control device for protecting a transformer may be used. In addition, the relay characteristics described in the present embodiment are absolutely described as an example, and a current balance protection and control device and so on to monitor the current balance of the respective lines based on Kirchhoff's law may be used.

In addition, in the protection and control device for the bus protection, it is not presupposed that a Main relay and a FD relay are provided. That is, the protection and control devices are separated into a protection and control device to judge the division cutoff of a bus and a protection and control device to judge the package cutoff of the bus, and the function of the protection and control device to judge the package cutoff of the bus may be implemented in the relay calculating unit 308 of the MU 101.

Figure 8:
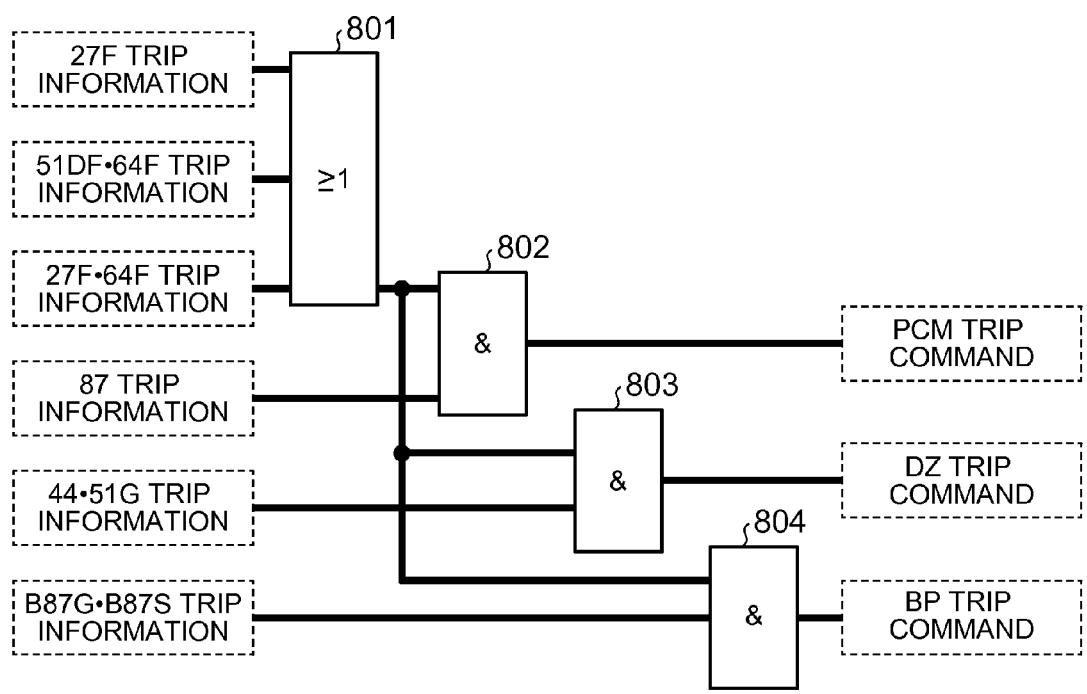
FIG. 8 is a diagram showing an example of the control logic configuration of the trip command output unit of the first embodiment.

Furthermore, the control logic configuration of the trip command output unit 307 of the MU 101 of the present embodiment has been shown in FIG. 4, but the control logic configuration shown in FIG. 8 may be used. This control logic configuration is provided with an OR gate 801, and AND gates 802-804. That is, in case that the trip command output unit 307 receives any one of the 27F trip information, the 51DF•64F trip information, and the 27F•64F trip information, and the 87 trip information, it outputs the PCM trip command. In case that the trip command output unit 307 receives any one of the 27F trip information, the 51DF•64F trip information, and the 27F•64F trip information, and the 44•51G trip information, it outputs the DZ trip command. In case that the trip command output unit 307 receives any one of the 27F trip information, the 51DF•64F trip information, and the 27F•64F trip information, and the B87G•B87S trip information, it outputs the BP trip command.

The trip command output unit 307 is composed of the control logic configuration shown in FIG. 8 as described above, and thereby the contact hardware of the trip circuit which the trip command output unit 307 is provided with can be reduced more than that of the control logic configuration of FIG. 4.

In addition, an example which is provided with the MU 101 and the process bus 103 is shown in the present embodiment, but the protection and control devices 105-107 may be connected to a standby MU through a standby process bus. Here, when a failure of the MU 101 or the process bus 103 is detected, the protection and control devices 105-107 are switched over to the standby MU. The standby MU and the standby process bus are provided to attempt redundancy like this, and thereby a further stable operation of the electric power system becomes possible.

As the state of the above-described standby MU, a hot standby state, a warm standby state, or a cold standby state is thought of.

The hot standby state shows a state in which the standby MU performs the same operation as the MU 101 at the normal time. That is, the standby MU detects the electric variables from the CT and the VT which are installed in the electric power system, and outputs the electric variable information to the protection and control devices 105-107, similarly as the MU 101. At the normal time without any failure, the protection and control devices 105-107 discard the electric variable information obtained from the standby MU, respectively. When a failure occurs, the protection and control devices 105-107 judge whether or not to output the main trip information based on the electric variable information obtained from the standby MU, respectively.

The warm standby state shows a state in which the standby MU is started but the application to output the electric variable information is not started. At the normal time without any failure, the standby MU does not output the electric variable information, and the protection and control devices 105-107 judge whether or not to output the main trip information based on the electric variable information obtained from the MU 101, respectively. When a failure occurs, the standby MU starts the application to output the electric variable information, and outputs the electric variable information to the protection and control devices 105-107 through the standby process bus, and the protection and control devices 105-107 judge whether or not to output the main trip information based on the electric variable information obtained from the standby MU, respectively.

The cold standby state shows a state in which the standby MU is not started. At the normal time without any failure, the standby MU is not started. When a failure occurs, the standby MU is started and then outputs the electric variable information to the protection and control device 105-107 through the standby process bus, and the protection and control device 105-107 judges whether or not to output the main trip information based on the electric variable information obtained from the standby MU, respectively.

Second Embodiment

Figure 9:
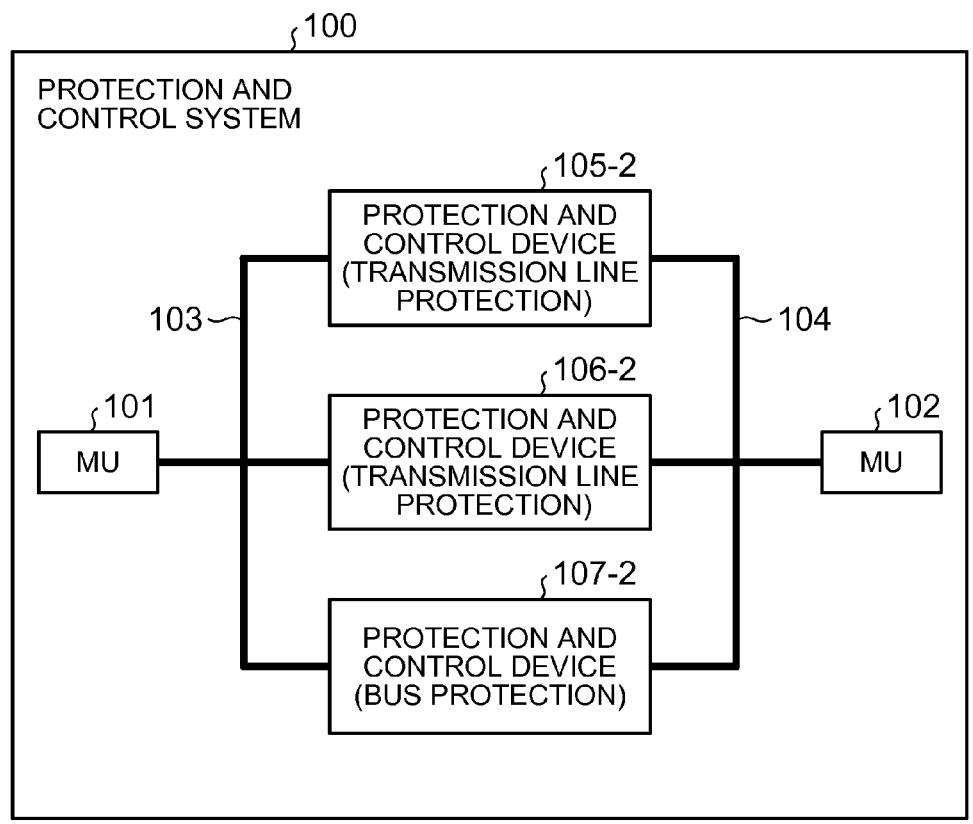
FIG. 9 is a diagram showing the configuration of the protection and control system according to a second embodiment.

The protection and control system 100 of a second embodiment will be described using FIG. 9, but the same symbols are given to the same constituent components of the present embodiment as in the first embodiment, and the description thereof will be omitted. The point that the configuration of the present embodiment is different from that of the first embodiment is that a MU 102 and a process bus 104 are further provided and the protection and control devices 105-107 are replaced by protection and control device 105-2-107-2, respectively.

The MU 102 is provided with the same function and configuration as the MU 101, and the process bus 104 is provided with the same function and configuration as the process bus 103. In addition, the protection and control devices 105-2-107-2 are connected to the process buses 103 and 104.

Each of the protection and control device 105-2-107-2 is composed of a computer provided with a CPU, a memory and so on. The point that the protection and control devices 105-2-107-2 are different from the protection and control devices 105-107 of the first embodiment, respectively is that each of the protection and control devices 105-2-107-2 is connected to the process bus 104 in addition to the process bus 103, and obtains the electric variable information from the MU 102 through the process bus 104. In addition, each of the protection and control devices 105-2-107-2 judges whether or not to open a circuit breaker not shown based on this electric variable information. In case that each of the protection and control devices 105-2-107-2 judges to open the circuit breaker, it outputs the main trip information to the process bus 103.

Figure 10:
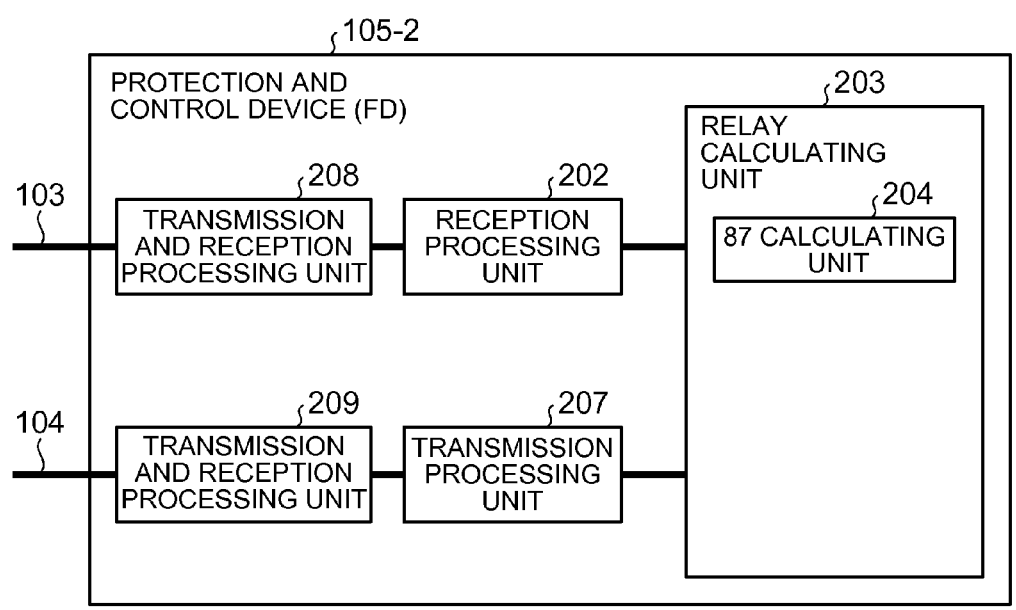
FIG. 10 is a functional block diagram showing the configuration of the protection and control device of the second embodiment.

This protection and control device 105-2 will be described as an example of these protection and control devices 105-2-107-2 using FIG. 10. FIG. 10 is a functional block diagram showing the configuration of the protection and control device 105-2.

The point that the protection and control device 105-2 is different from the protection and control device 105 of the first embodiment is that it is provided with transmission processing units 208, 209 in place of the transmission and reception processing unit 201.

The transmission processing unit 208 is connected to the process bus 103 and the reception processing unit 202, and obtains the electric variable information outputted from the MU 101 through the process bus 103 and outputs it to the reception processing unit 202.

The transmission processing unit 209 is connected to the transmission processing unit 207 and the process bus 104, and outputs the main trip information outputted from the transmission processing unit 207 to the MU 102 through the process bus 104.

According to the protection and control system of the present embodiment, in addition to the effect of the first embodiment, the MUs 101, 102, the process buses 103, 104 are provided redundantly, and thereby in case that a malfunction occurs in any of the equipments, it becomes possible to replace the equipment by a normal equipment. Accordingly, a highly reliable operation of the electric power system becomes possible.

Third Embodiment

Figure 11:
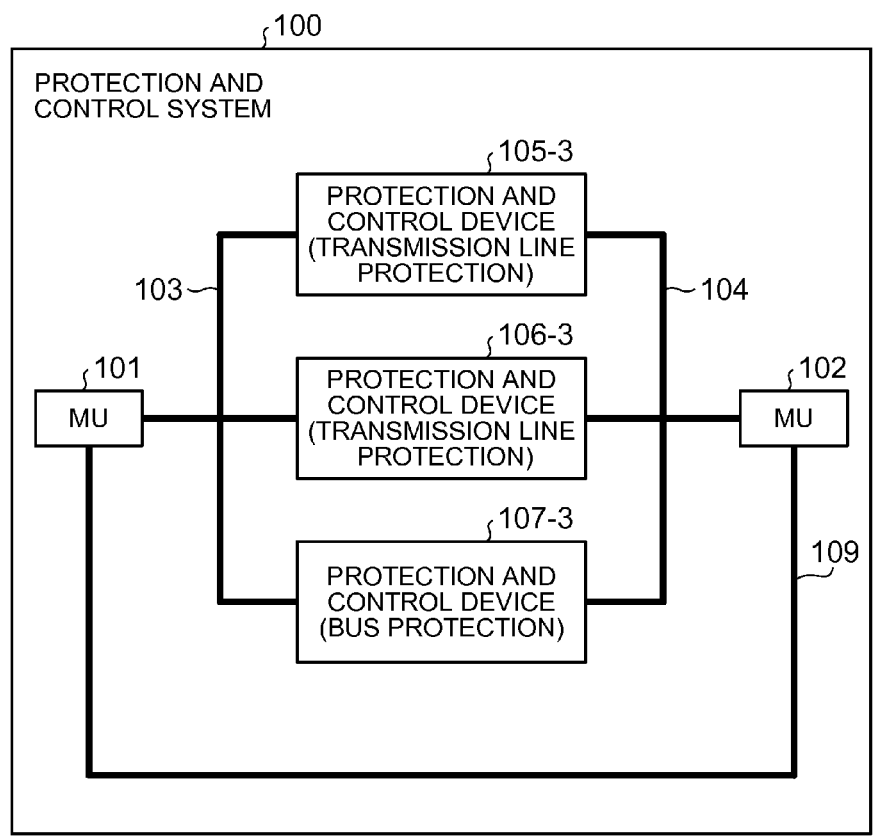
FIG. 11 is a diagram showing the configuration of the protection and control system according to a third embodiment

The protection and control system 100 of a third embodiment will be described using FIG. 11, but the same symbols are given to the same constituent components of the present embodiment as in the first embodiment, and the description thereof will be omitted. The point that the configuration of the present embodiment is different from the first embodiment is that the protection and control system 100 is further provided with the MU 102 and the process bus 104, and the protection and control devices 105-107 are replaced by protection and control devices 105-3-107-3. Furthermore, the MU 101 and the MU 102 are connected by a cable 109.

The MU 102 is provided with the same function and configuration as the MU 101, and the process bus 104 is provided with the same function and configuration as the process bus 103. In addition, the protection and control devices 105-3-107-3 are connected to the process buses 103 and 104.

The protection and control devices 105-3-107-3 have almost the same configuration as the protection and control devices 105-107 of the first embodiment, respectively, but differs in the point that each of the protection and control devices 105-3-107-3 obtains the electric variable information through the process bus 104 and outputs the main trip information to the MU 102 through the process bus 104.

The cable 109 is put into practice with a metal cable and so on, and connects between the MU 101 and the MU 102. Accordingly, a trip circuit composing the trip command output unit 307 of the MU 101 and a trip circuit composing the trip command output unit of the MU 102 are connected, and thereby the main trip information obtained by the MU 102 is transferred to the MU 101.

That is, the trip command output unit 307 of the MU 101 judges whether or not to output the trip command from the control logic configuration shown in FIG. 4 or FIG. 8, based on the FD trip information (the 27F trip information, the 51DF•64F trip information, and the 27F•64F trip information) obtained from the relay calculating unit 308, and the main trip information (the 87 trip information, the 44•51G trip information, and the B87G•B87S trip information) obtained from the MU 102 through the cable 109.

According to the protection and control system 100 of the present embodiment, in addition to the effect of the first embodiment, the MUs 101, 102, the process buses 103, 104 are provided redundantly, and thereby in case that a malfunction occurs in any of the equipments, it becomes possible to replace the equipment by a normal equipment. Accordingly, a highly reliable operation of the electric power system becomes possible.

In the configuration of the MU 101 in the first to third embodiments, the relay calculating unit 308 judges whether or not a system fault occurs in the zone to be protected based on the electric variable information outputted from the A/D converter 303 as shown in FIG. 3.

But, a second input converter, a second analog filter, and a second A/D converter may be newly provided. Here, the second input converter, the second analog filter, and the second A/D converter which are newly provided have the same functions as the above described input converter 301, the analog filter 302, and the A/D converter 303, respectively.

And the relay calculating unit 308 obtains the electric variable information which is digitally converted by the second A/D converter, judges whether or not a system fault occurs in the zone to be protected, and outputs the FD trip information to the trip command output unit 307.

As described above, the second input converter, the second analog filter, and the second A/D converter are provided for redundancy, and thereby it becomes possible to prevent the erroneous operation to the circuit breaker, and a further highly reliable operation of the electric power system becomes possible.

According to the embodiments of the present invention, it becomes possible to provide a protection and control system, a protection and control device, and a merging unit which can suppress the hardware amount in the protection and control system to which a process bus is applied.

While certain embodiments have been described, those embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A protection and control system, comprising:
a first merging unit which obtains an electric variable from a transformer installed in an electric power system, and digitally converts the obtained electric variable to output the converted electric as first electric variable information to a network; and
a plurality of protection and control devices, each of which obtains the first electric variable information from the first merging unit through the network, judges whether or not a system fault occurs in a zone to be protected of the electric power system based on a predetermined relay characteristic, and outputs main trip information to the network when that the system fault occurs is judged,
wherein the first merging unit judges whether or not the system fault occurs in the zone to be protected of the electric power system based on the first electric variable information, and a plurality of the relay characteristics which are predetermined as respective fault detection relays of the protection and control devices, holds FD trip information when that the system fault occurs is judged, and judges opening or closing of a circuit breaker or a switch which is installed in the electric power system based on the FD trip information and the main trip information.

2. A protection and control system, comprising:
a first merging unit which obtains an electric variable from a transformer installed in an electric power system, and digitally converts the obtained electric variable to output as first electric variable information to a first network;
a second merging unit which obtains the electric variable detected by the transformer installed in the electric power system, and digitally converts the obtained electric variable to output as second electric variable information which is different from the first electric variable information to a second network; and
a plurality of protection and control devices, each of which obtains the second electric variable information from the second merging unit through the second network, judges whether or not a system fault occurs in a zone to be protected of the electric power system based on a predetermined relay characteristic, and outputs main trip information to the first network when that the system fault occurs is judged,
wherein the first merging unit judges whether or not the system fault occurs in the zone to be protected based on the first electric variable information, and a plurality of the relay characteristics which are predetermined as respective fault detection relays of the protection and control devices, holds FD trip information when that the system fault occurs is judged, and judges opening or closing of a circuit breaker or a switch which is installed in the electric power system based on the FD trip information and the main trip information.

3. A protection and control system, comprising:

a first merging unit which obtains an electric variable from a transformer installed in an electric power system, and digitally converts the obtained electric variable to output the converted electric as first electric variable information to a first network;

a second merging unit which obtains the electric variable detected by the transformer installed in the electric power system, and digitally converts the obtained electric variable to output as second electric variable information which is different from the first electric variable information to a second network;

a plurality of protection and control devices, each of which obtains the second electric variable information from the second merging unit through the second network, judges whether or not a system fault occurs in a zone to be protected of the electric power system based on a predetermined relay characteristic, and outputs main trip information to the second network when that the system fault occurs is judged; and a cable to connect the first merging unit and the second merging unit, wherein the first merging unit judges whether or not the system fault occurs in the zone to be protected of the electric power system based on the first electric variable information, and a plurality of the relay characteristics which are predetermined as respective fault detection relays of the protection and control devices, holds FD trip information when that the system fault occurs is judged, and judges opening or closing of a circuit breaker or a switch which is installed in the electric power system based on the FD trip information and the main trip information obtained from the second merging unit through the cable.

4. The protection and control system according to claim 1, wherein:

the first merging unit judges to open the circuit breaker or the switch in case that the FD trip information is outputted based on the relay characteristic corresponding to the fault detection relay of the main trip information.

5. The protection and control system according to claim 1, wherein:

the first merging unit comprises a plurality of input converters each of which obtains the electric variable from the transformer installed in the electric power system, and a plurality of A/D converters which digitally convert the electric variables obtained by the input converters as the first electric variable information, respectively; and the first merging unit obtains the first electric variable information which is outputted to the first network, and the first electric variable information which is used for judging whether or not the system fault occurs in the zone to be protected of the electric power system from the different A/D converters.

6. A merging unit, comprising:

an input converter which obtains an electric variable from a transformer installed in an electric power system;

an A/D converter which digitally converts the electric variable obtained by the input converter as electric variable information;

a transmission processing unit which outputs the electric variable information obtained from the A/D converter to a network;

a relay calculating unit which judges whether or not a system fault occurs in a zone to be protected of the electric power system based on the electric variable information obtained from the transmission processing unit and a plurality of relay characteristics which are predetermined as respective fault detection relays of a plurality of protection and control devices connected to the network, and outputs FD trip information when that the system fault occurs is judged; and a trip command output unit which judges opening or closing of a circuit breaker or a switch which is installed in the electric power system;

wherein the transmission processing unit is connected to the network and obtains main trip information outputted from the protection and control devices each having the predetermined relay characteristic; and wherein the trip command output unit judges opening or closing of the circuit breaker or the switch based on the FD trip information obtained from the relay calculating unit and the main trip information obtained by the transmission processing unit.

7. The merging unit according to claim 6, wherein:

the trip command output unit judges to open the circuit breaker or the switch, in case that the FD trip information is outputted based on the relay characteristic corresponding to the fault detection relay of the main trip information.

8. The merging unit according to claim 6, wherein:

the merging unit comprises a plurality of the input converters and the A/D converters; and the merging unit obtains the electric variable information which the transmission processing unit outputs to the network, and the electric variable information which the relay calculating unit uses for judging whether or not the system fault occurs in the zone to be protected from the different A/D converters.

* * * * *